United States Patent Office 3,370,968
Patented Feb. 27, 1968

3,370,968
REFRACTORY SHAPES AND METHOD OF PRODUCING THE SAME
Ernest P. Weaver, Pittsburgh, Pa., assignor to Harbison-Walker Refractories Company, Pittsburgh, Pa., a corporation of Pennsylvania
No Drawing. Filed Mar. 16, 1966, Ser. No. 534,647
The portion of the term of the patent subsequent to June 14, 1983, has been disclaimed
9 Claims. (Cl. 106—56)

ABSTRACT OF THE DISCLOSURE

The fabrication of unburned refractory shapes which are bonded together by the in situ reaction product of from on the order of 3 to 10 parts, by weight, of a bonding additive per 100 parts, by weight, of refractory. The additive is comprised of 2½ to 4 parts, by weight, of a saturated fluid pitch and from ½ to 6 parts, by weight, of particulate carbon black. The shapes are cold-formed and, thereafter, baked for a sufficient time to produce the desired reaction product.

---

This invention relates to refractory shapes and to a method of producing such shapes, and more particularly the invention relates to improved tar bonded basic refractory shapes and to a method of producing the same.

Materials for construction and/or lining vessels which operate at high temperature conventionally are nonmetallic materials commonly referred to as refractories. Such refractories may be provided in unconsolidated masses for in situ forming, or as preformed shapes. When preformed shapes are used they must have sufficient strength to withstand shipment, handling during construction and operation of the formed vessel. The preformed shapes may be made as chemically bonded, unburned shapes or as ceramically bonded, burned shapes. The chemically bonded shapes are advantageous in some respects, as for example, high heating or burning of the shapes is not required.

Chemically bonded refractory shapes have heretofore been produced as tar bonded refractories. These are made by mixing size graded refractory aggregate with a tar and then foming the desired shape as by molding, pressing, impacting, extruding, piercing-and-forming, and the like. Some of the materials used in the prior art bonding systems include medium and/or hard pitch, creosote, other carbonaceous materials, such as bunker "C" oil, gilsonite, shale tar, asphalt, coal, peat, etc. When using some types of pitch additions, some difficulty has been encountered. Powdered bond pitch has a melting point in the range of 275° F. to 325° F., which requires heating to obtain necessary tackiness, plasticity and workability in a brick mix, for instance. Moreover, organic solvents used with or incorporated in the carbonaceous material tend to volatilize when heated, creating health hazards to people sensitive to the organics and a safety hazard due to explosive vapors released in confined areas.

Briefly, one aspect of this invention is to provide a good quality refractory shape in which the refractory grains are bonded together by a reaction product of an unsaturated fluid pitch and carbon black. The reaction is promoted by heating a mix of the refractory grains, the unsaturated fluid pitch and the carbon black for a sufficient time for polymerization to occur. In another aspect of the invention, a method for producing such shape is provided.

Therefore, it is an object of the invention to provide an improved refractory shape bonded by the reaction product of an unsaturated fluid pitch and carbon black, and the method of producing such shapes.

Shapes of basic refractories are characterized by high bulk density, high melting points, high resistance to the chemical attack by basic slags and oxides, relatively high rates of thermal expansion and high to moderate thermal conductivity. The basic refractories are extensively used in steelmaking, and particularly, in oxygen steel-making vessels.

A further object of the invention is to provide basic refractory shapes in which the basic refractory grains are bonded together by the reaction product of an unsaturated fluid pitch and carbon black.

Another object of the invention is to provide refractory shapes of other types of refractories bonded together by the said reaction product.

A further object of the invention is to provide a method of forming such shapes. The method includes mixing a refractory aggregate with an unsaturated fluid pitch and carbon black, cold forming the mix into a shape, and then baking the formed shape at from 350° F. to 500° F. to polymerize the bonding ingredients.

According to the invention the total amount of bonding materials is on the order of 3 to 10 parts per 100 parts of the refractory aggregate. The unsaturated fluid pitch may be used in amounts of from 2½ to 4 parts, and preferably from 3 to 3½ parts. The carbon black may be used in amounts of from ½ to 6 parts and preferably in the range of from 3 to 5 parts. The unsaturated fluid pitch is derived from distillation of extracts of animal and vegetable materials such as lard, tallow, bone fat, garbage and sewage, wool grease, packing house waste, palm oil, linseed oil, soybean oil, etc. The residue or bottoms from such distillation are referred to as "fatty acid pitches." Such materials are fluid, as distinguished from waxy or soapy at ambient temperatures, about 70° F. These pitches have fairly high iodine numbers and are sometimes called "unsaturated" fatty acid or fluid pitches. For example, linseed pitch has an acid number in the range of from 30 to 60, a viscosity of 150 to 350 (Stormer viscosity, seconds at 25° C.) and an iodine value of 110 to 125. Another example is soybean pitch which has an acid number in the range of from 30 to 60, a viscosity of from 50 to 200 (Stormer viscosity, seconds at 20° C.) and an iodine value of approximately 100 to 110. The pitches, as would be expected, consist essentially of carbon, hydrogen, oxygen, and nitrogen atoms. Further background material on these pitches is set forth in U.S. patent application Serial Number 476,683 filed August 2, 1965. Said application is a continuation-in-part of then copending applications 398,782 and 425,619 both of which were abandoned in favor of application 476,683, now United States Patent No. 3,256,104, and assigned to the assignee of this application.

The carbon black is preferably of relatively large particle size of a low order of surface activity. One preferred carbon black is produced by Cabot Corporation, of Boston, Massachusetts, under the name of Sterling MT–X23. Tests have shown this type of carbon black to be surprisingly effective in a particular type of bonding mixture for basic refractories.

The preferred basic refractory aggregate is selected fom dead burned dolomite (CaO·MgO), dead burned magnesite, or magnesia (MgO) and/or mixtures thereof. Refractories of dead burned brucite and like magnesian materials, chrome ore, hard burned lime, olivine, forsterite, etc. have also been proposed and are included in one aspect of this invention.

Generally, a mixture of refractories is used to form the shapes of the invention, and a typical mixture with analysis, as used in the following tests, is as follows:

Material identified as Magnesite A was graded by screens at minus 4 on 8 mesh (passes a 4 mesh screen and remains on an 8 mesh screen) screen (Tyler series) and it has the following analyses:

| | Percent |
|---|---|
| $SiO_2$ | 0.8–1.0 |
| $Al_2O_3$ | 0.30 |
| $Fe_2O_3$ | 0.30 |
| CaO | 2.4–3.2 |
| MgO | 94–95 |

Material identified as Magnesite B was graded to pass a 10 mesh screen and remain on a 28 mesh screen (minus 10 on 28 mesh). The analyses of the magnesite is as follows:

| | Percent |
|---|---|
| $SiO_2$ | 5.3 |
| $Al_2O_3$ | 1.8 |
| $Fe_2O_3$ | 4.5 |
| CaO | 14.7 |
| MgO | 74.1 |

Material identified as Magnesite C was graded as ball mill fines (55% passing a 325 mesh screen and substantially all passing a 65 mesh screen) and the analyses of this material is as follows:

| | Percent |
|---|---|
| $SiO_2$ | 0.7 |
| $Al_2O_3$ | 0.3 |
| $Fe_2O_3$ | 0.3 |
| CaO | 0.8 |
| MgO | 98.0 |

The refractory grains were mixed in a desired amount of each to provide a refractory brickmaking size graded mix and the fluid pitch and particular carbon black were added with thorough mixing. The resultant mixture was placed in brickmolds and cold formed (about 70° F.) on a conventional brick press. The resultant green brick were baked one high on a flat surface. The temperature of the brick was raised at about 100° F. per hour to either 350° F. where they were held for 16 hours, or to 500° F. with a 3 hour hold. As seen from the following table of the actual tests, there was little or no change in bulk density or strength of brick (according to the present invention) baked at either temperature.

The following table shows the formulation and the test results of bricks made according to the invention as compared to some not made according to the invention. In the table, Mixes A and B are representative of the invention, differing only in the proportions of soybean pitch and MT–X23 carbon black. Mix C (not according to the invention) is similar to Mix B, but substitutes other materials for both the carbon black and soybean pitch. Mix D (also not according to the invention) is similar to Mix A, differing only in the substitution of a different form of carbon.

TABLE I

| | Mix | | | |
|---|---|---|---|---|
| | A | B | C | D |
| Magnesite A | 30 | 30 | 30 | 30 |
| Magnesite B | 30 | 30 | 30 | 30 |
| Magnesite C | 37 | 35 | 35 | 37 |
| Soybean Pitch | 3½ | 3 | | 3½ |
| Carbon Clack (MT–X23) | 3 | 5 | | |
| Creosote | | | 3 | |
| Powdered hard pitch | | | 5 | 3 |
| Bulk Density, pcf.: | | | | |
| Before baking | 190 | 184 | 185 | 182 |
| After baking to 350° F | 188 | 185 | (¹) | 176 |
| After baking to 500° F | 188 | 184 | | (¹) |
| Modulus of Rupture, p.s.i.: | | | | |
| After baking to 350° F | 480 | 530 | (¹) | 400 |
| After baking to 500° F | 500 | 490 | | (¹) |
| Appearance after baking | (²) | | (³) | (⁴) |

¹ Not done.
² No cracks.
³ Badly cracked.
⁴ Badly cracked after 500° F. baking.

The mixes were pressed at a normal brickmaking pressure of about 8000 p.s.i., and the green unbaked brick had good strength. After baking, the brick of mixes A and B were of good quality and strength. Particularly interesting, however, is a comparison of the results of testing mixes A and B with C and D.

Mix D is within the teachings of application 476,683 mentioned above. The work here reported indicates that only a particular type of solid carbon material is best with the soybean or like unsaturated pitch when one wishes ultimately to make baked brick at higher baking temperatures. Mix C, using the liquid creosote instead of the liquid pitch indicates the importance of the solvent or carrier liquid chosen for the carbon. In other, but comparable tests using other types of carbon black and also using graphite, I established to my satisfaction that the present combination of a particular type of carbon black capable of reacting in the manner herein described and claimed is unique and superior in many desirable physical properties. The soybean pitch is a preferred pitch as it produces a good quality brick and is economical for use.

The bonding system of the unsaturated fluid pitch and carbon black, in the broader aspect of the invention, is useful with other refractories, such as fire clays, ganisters or silica rock, high alumina, mullite, etc. The bonding system is comprised of about 3 to 10 parts, by weight, of a bonding additive per 100 parts, by weight, of refractory. The additive is comprised of 2½ to 4 parts, by weight, of an unsaturated fluid pitch and ½ to 6 parts, by weight, of particulate carbon black. When the preferred soybean pitch is used, about 3 to 3½ parts with 3 to 5 parts of carbon black provide good economy with good quality shapes.

In the foregoing, all parts and percentages are by weight, and all refractory chemical analyses on an oxide basis should be considered as typical and in conformity with conventional practices of reporting the chemical constituents of refractory materials. The screen sizes are all standard Tyler series of screens or sieves, unless specifically mentioned to the contrary.

Having thus described the invention in detail and with sufficient particularity to enable those skilled in the art to practice it, what is desired to have protected by Letters Patent is set forth in the following claims:

I claim:

1. An unburned refractory shape consisting essentially of refractory grains bonded together in a desired shape by a polymer and a carbon bond distributed throughout the shape about said grains, said polymer and carbon bonds being the in situ reaction product of an unsaturated fluid pitch and carbon black heated to a temperature of from 350° F. to 500° F., the fluid pitch amounting to about 2½ to 4 parts, by weight, and the carbon black from about ½ to 6 parts, by weight, per 100 parts, by weight, of the refractory grains.

2. An unburned refractory shape according to claim 1 in which said unsaturated fluid pitch is soybean pitch.

3. An unburned refractory shape according to claim 1 in which said unsaturated fluid pitch is linseed pitch.

4. An unburned refractory shape according to claim 1 in which said refractory grains are basic refractory grains.

5. An unburned refractory shape according to claim 2 wherein said soybean pitch is present in an amount of from 3 to 3½ parts and said carbon black is present in an amount of from 3 to 5 parts per 100 parts of refractory.

6. The method of making unburned refractory shapes consisting essentially of mixing at ambient temperatures about 100 parts by weight, of refractory grains with about 2½ to 4 parts, by weight, of an unsaturated fluid pitch and ½ to 6 parts, by weight, of particulate carbon black, cold forming the resultant mix at about ambient temperature into desired shapes, and then baking the formed shapes at from 350° F. to 500° F. for a sufficient time to produce a reaction product of said pitch and said carbon black thereby producing a chemically bonded refractory shape.

7. The method of claim 6 wherein the heating of the cold formed shape is continued from 3 to 16 hours.

8. The method of claim 6 wherein said unsaturated fluid pitch is soybean pitch and said carbon black has relatively large particles.

9. The method of claim 6 wherein said soybean pitch is present in an amount of 3 to 3½ parts and said carbon black is present in an amount of 3 to 5 parts per 100 parts of said refractory.

References Cited

UNITED STATES PATENTS

| | | | |
|---|---|---|---|
| 3,233,017 | 2/1966 | Weaver et al. | 106—58 |
| 3,236,664 | 2/1966 | Wilson | 106—58 |
| 3,256,104 | 6/1966 | Weaver | 106—58 |

TOBIAS E. LEVOW, *Primary Examiner.*

JAMES E. POER, *Examiner.*